US010476709B2

(12) United States Patent
Horvat et al.

(10) Patent No.: US 10,476,709 B2
(45) Date of Patent: Nov. 12, 2019

(54) RADIO RECEIVER AND METHOD FOR DETECTING A LAYER OF A MULTI-LAYERED SIGNAL

(71) Applicant: Intel IP Corporation, Santa Clara, CA (US)

(72) Inventors: Michael Horvat, Munich (DE); Tobias Kurpjuhn, Groebenzell (DE); Christoph Jans, Dresden (DE); Xiaofeng Wu, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/755,352

(22) PCT Filed: Aug. 2, 2016

(86) PCT No.: PCT/EP2016/068399
§ 371 (c)(1),
(2) Date: Feb. 26, 2018

(87) PCT Pub. No.: WO2017/045833
PCT Pub. Date: Mar. 23, 2017

(65) Prior Publication Data
US 2018/0248719 A1    Aug. 30, 2018

(30) Foreign Application Priority Data
Sep. 17, 2015    (DE) .......................... 10 2015 115 716

(51) Int. Cl.
*H03D 1/04* (2006.01)
*H04L 25/03* (2006.01)
(Continued)

(52) U.S. Cl.
CPC ..... *H04L 25/03891* (2013.01); *H04B 7/0413* (2013.01); *H04B 7/0845* (2013.01);
(Continued)

(58) Field of Classification Search
CPC ......... H04L 25/03891; H04L 25/03993; H04L 2025/03426; H04B 7/0413; H04B 7/0854; H04B 7/0845
See application file for complete search history.

(56) References Cited

U.S. PATENT DOCUMENTS

2008/0181342 A1    7/2008   Cho et al.
2009/0304116 A1    12/2009  Challa et al.
(Continued)

FOREIGN PATENT DOCUMENTS

EP    2779547 A1    9/2014

OTHER PUBLICATIONS

European Patent Office, PCT International Search Report issued for PCT/EP2016/068399, 4 pgs., dated Nov. 10, 2016.

*Primary Examiner* — Dhaval V Patel
(74) *Attorney, Agent, or Firm* — Schiff Hardin LLP (57) ABSTRACT

A radio receiver is disclosed, comprising: a receiving stage configured to receive a multi-layered signal comprising a plurality of layers; a division stage configured to divide the plurality of layers into a first subset and a second subset; a first whitening filter configured to filter the multi-layered signal based on a noise and interference covariance measure derived from the second subset to provide a first filtered multi-layered signal; and a first detection stage configured to detect at least one layer of the first subset based on the first filtered multi-layered signal.

24 Claims, 8 Drawing Sheets

(51) Int. Cl.
 *H04B 7/08* (2006.01)
 *H04B 7/0413* (2017.01)
(52) U.S. Cl.
 CPC ..... *H04B 7/0854* (2013.01); *H04L 25/03993* (2013.01); *H04L 2025/03426* (2013.01)

(56) References Cited

U.S. PATENT DOCUMENTS

| | | |
|---|---|---|
| 2014/0160949 A1 | 6/2014 | Clausen et al. |
| 2014/0169408 A1* | 6/2014 | Bayesteh ............ H04B 7/0473 375/144 |
| 2015/0098440 A1* | 4/2015 | Yang .................... H04J 11/0056 370/330 |

* cited by examiner

RADIO RECEIVER AND METHOD FOR
DETECTING A LAYER OF A
MULTI-LAYERED SIGNAL

FIELD

The disclosure relates to radio receivers and a method for detecting a layer of a multi-layered signal. In particular, the disclosure relates to techniques for noise and subset-interference whitening for reduced-layer detection.

BACKGROUND

Figure 1:
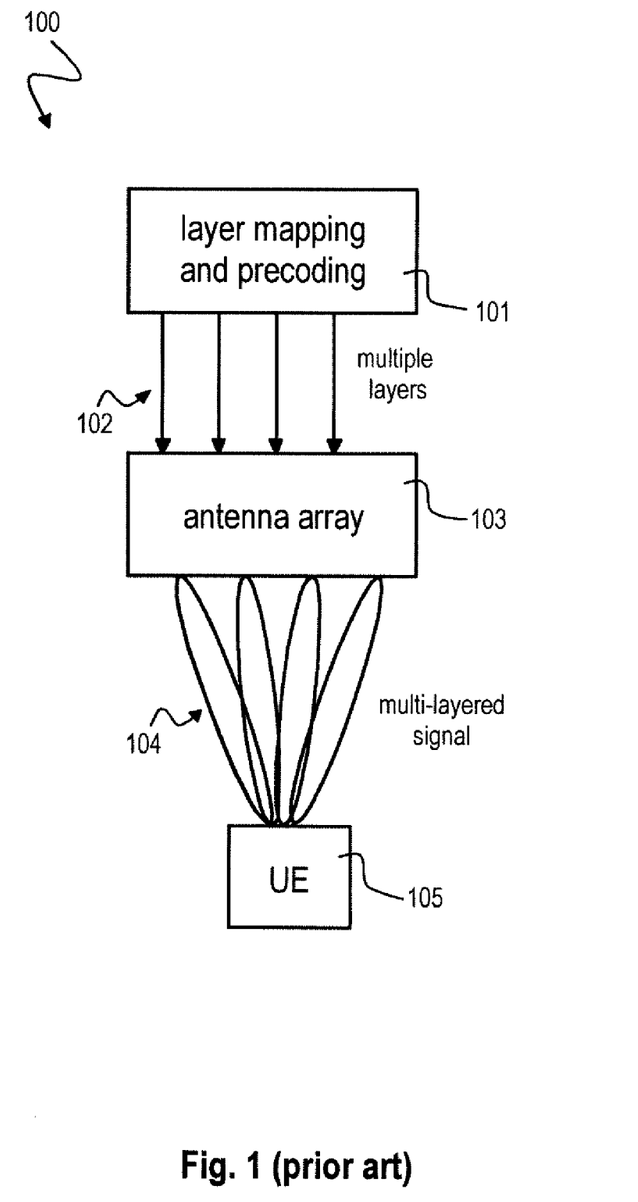
FIG. 1 is a schematic diagram illustrating a conventional beamforming system 100.

In the field of beamforming, a receive signal may be composed of M layers. Each of the M layers may be interfered by the M−1 other layers. FIG. 1 shows a beamforming system 100 with an antenna array 103 generating a multi-layered signal 104 for transmission to a mobile device (UE) 105. The antenna array 103 generates the multi-layered signal 104 based on multiple layers 102 received from a layer mapping and precoding module 101.

Joint detection of all M layers would be the optimum solution, which corresponds to a joint M-layer detector as single HW block. Complexity-wise this is not an ideal solution. Typically such "all-layer" detector is only applied for specific subframe configurations and would be a complexity overhead for a majority of subframes, in which less transmitted layers exist in the receive signal. There is a need to design a receiver capable of receiving a multi-layered signal with reduced complexity.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
eNodeB,
eNB: base station,
MIMO: Multiple Input Multiple Output,
AP: Antenna Port,
LOS: Line Of Sight,
DMRS: demodulation specific reference signal,
EPDCCH: Enhanced Physical Control Channel,
RE: resource element The methods and devices described herein may be based on receivers capable of receiving multi-layered signals, e.g. mobile receivers of a mobile station, mobile terminal or user equipment. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular 4G and 5G. The methods and devices described below may be implemented in network nodes and base stations. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE and 5G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in MIMO systems and diversity receivers. Multiple-input multiple-output (MIMO) wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency resources. A diversity receiver uses two or more antennas to improve the quality and reliability of a wireless link.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
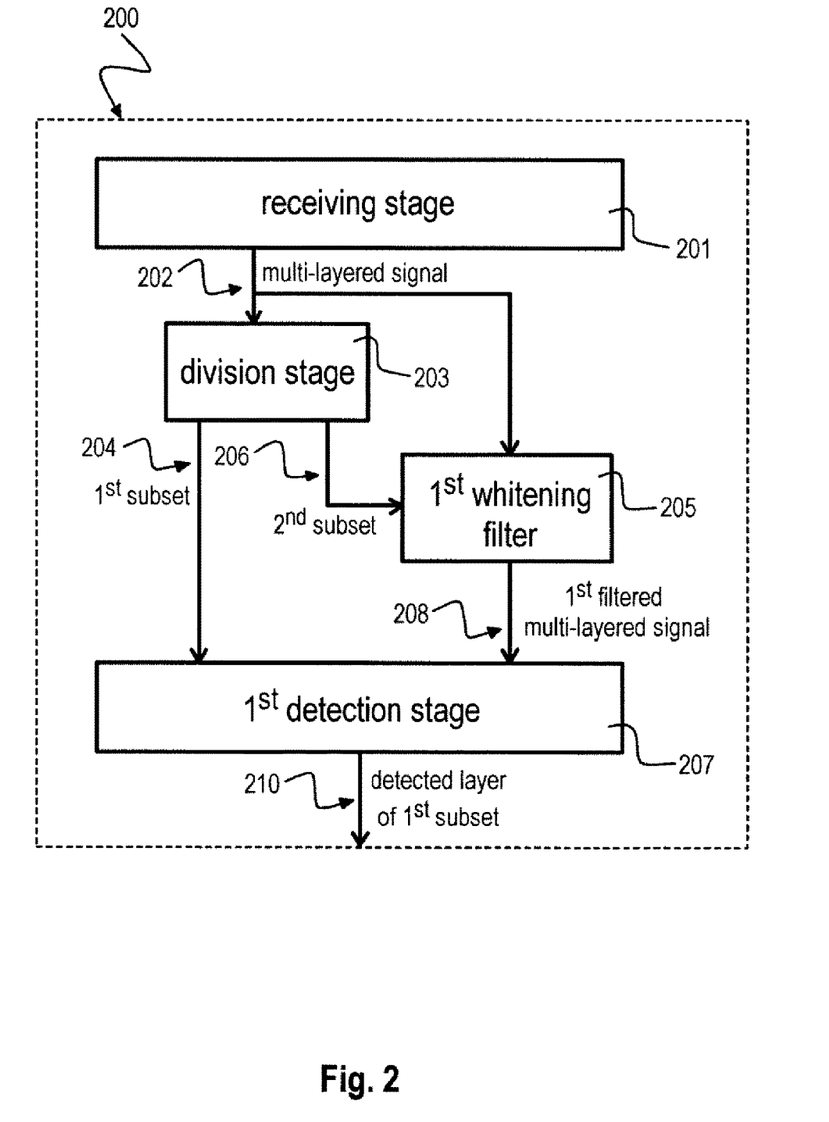
FIG. 2 is a block diagram illustrating an exemplary radio receiver 200 capable of receiving a multi-layered signal 202.

FIG. 2 is a block diagram illustrating an exemplary radio receiver 200 capable of receiving a multi-layered signal 202. The radio receiver 200 includes a receiving stage 201, a division stage 203, a first whitening filter 205 and a first detection stage 207. The receiving stage 201 receives a multi-layered signal 202 including a plurality of layers. The division stage 203 divides the plurality of layers into a first subset 204 and a second subset 206. The first whitening filter 205 filters the multi-layered signal 202 based on a noise and interference covariance measure, e.g. a noise and interference covariance matrix, derived from the second subset 206 to provide a first filtered multi-layered signal 208. The first detection stage 207 detects at least one layer 210 of the first subset 204 based on the first filtered multi-layered signal 208.

The first detection stage 207 may jointly detect the layers of the first subset 204 based on the first filtered multi-layered signal 208.

In an exemplary implementation form, the radio receiver 200 may iteratively apply the division stage 203 and the first whitening filter 205 to the multi-layered signal 202 until a single layer of the multi-layered signal 202 resides in the first subset 204. The radio receiver 200 hence supports joint detection of e.g. L<M layers and may be instantiated multiple times to detect all layers, e.g. according to the function ceil(M/L) in C-notation.

The division stage 203 may divide the plurality of layers of the multi-layered signal 202 for assigning each layer of the multi-layered signal 202 either to the first subset 204 or the second subset 206.

The first whitening filter 205 may provide the first filtered multi-layered signal 208 in which a noise-and-interference from the layers of the second subset 206 may be compensated or mitigated.

The first detection stage 207 may filter the first filtered multi-layered signal 208 with a Minimum Mean Square Error (MMSE) detection filter to detect the at least one layer 210 of the first subset 204, e.g. as described below with respect to FIGS. 3 and 4.

The radio receiver 200 may include a second whitening filter (not shown in FIG. 2) for filtering the multi-layered signal 202 based on a noise and interference covariance measure derived from the first subset 204 to provide a second filtered multi-layered signal. The radio receiver 200 may further include a second detection stage for detecting at least one layer of the second subset 206 based on the second filtered multi-layered signal.

The radio receiver 200 may further include a selection stage, e.g. as described below with respect to FIGS. 3 to 5, for selecting a first plurality of layers of the multi-layered signal 202 for division into the first subset 204 and a second plurality of layers of the multi-layered signal 202 for division into the second subset 206.

The radio receiver 200 may include an outer receiver for receiving the at least one layer 210 of the first subset 204 detected by the first detection stage 207 and the at least one layer of the second subset 206 detected by the second detection stage.

The selection stage may select the first plurality of layers and the second plurality of layers for providing an uninterrupted load to the outer receiver. The selection stage may select the first plurality of layers and the second plurality of layers based on a metric depending on the plurality of layers of the multi-layered signal. The metric may depend on power levels or channel-orthogonality levels of the plurality of layers of the multi-layered signal 202.

The radio receiver 200 may include a channel estimator for determining the power levels or an orthogonality measure, for instance Eigenvalues, of the plurality of layers of the multi-layered signal 202.

The metric may depend on priorities of the plurality of layers of the multi-layered signal 202.

Figure 3:
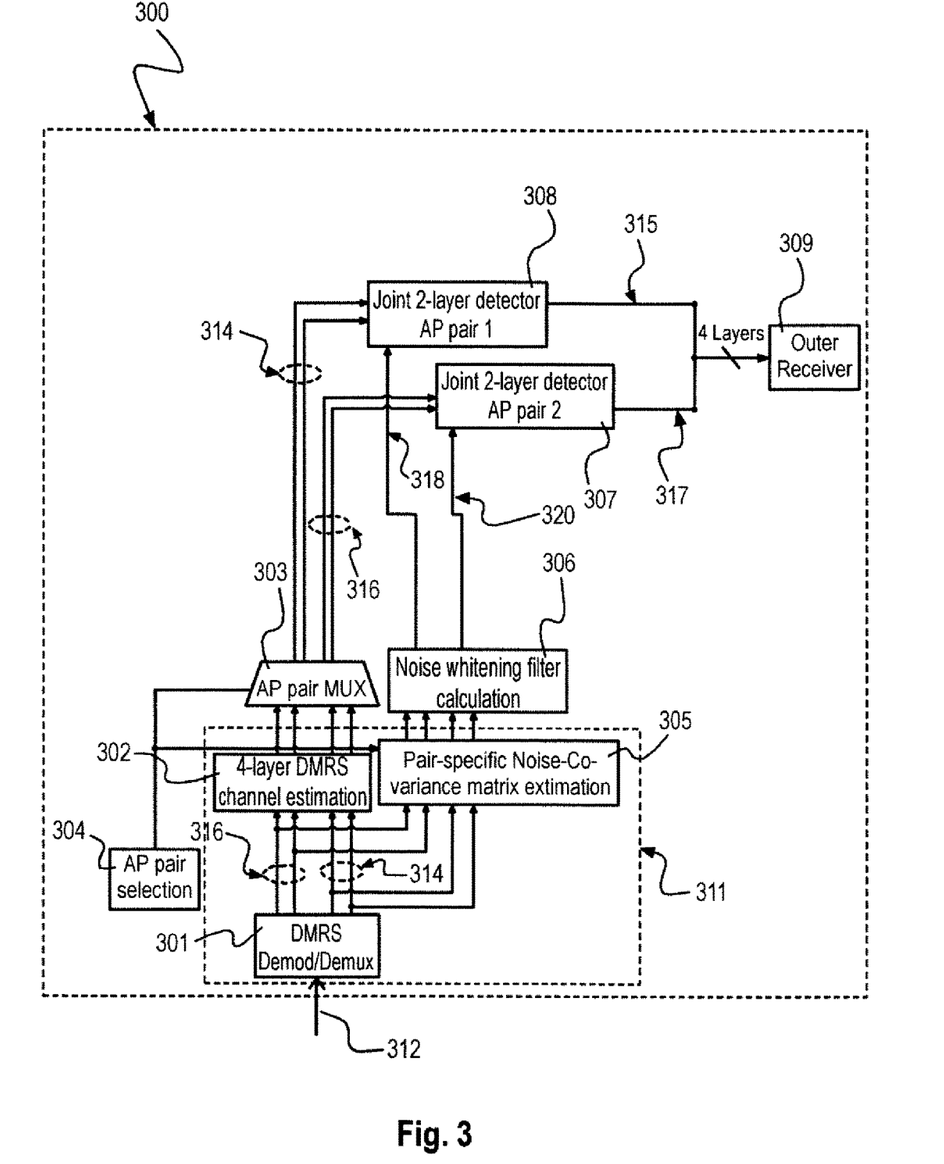
FIG. 3 is a block diagram illustrating an exemplary 2×2 layer whitening radio receiver 300.

FIG. 3 is a block diagram illustrating an exemplary 2×2 layer whitening radio receiver 300. The radio receiver 300 may be an exemplary embodiment of the radio receiver 200 described above with respect to FIG. 2. The radio receiver 300 includes a receiving stage 311, a division stage 301, a whitening filter 306 and a first detection stage 308.

The receiving stage 311 receives a four-layered signal 312 that may include a first layer, a second layer, a third layer and a fourth layer. The receiving stage 311 may include a DMRS demodulator/demultiplexer 301 for demodulating the four-layered signal 312, e.g. a four-layered DMRS signal (demodulation specific reference signal). The receiving stage 311 may further include a 4-layer DMRS channel estimation device 302 for estimating the channel of each layer signal of the four-layered signal 312. The receiving stage 311 may further include a pair-specific noise-covariance matrix estimation device for estimating or determining a noise covariance matrix, e.g. as described below.

The division stage 301, e.g. implemented by the DMRS demodulator/demultiplexer 301 divides or separates the four-layered signal 312 into a first two-layered signal 314 and a second two-layered signal 316.

The whitening filter 306 filters the four-layered signal 312 based on a noise and interference covariance matrix derived from the second two-layered signal 316 to provide a first filtered signal 318. The pair-specific noise-covariance estimation device 305 may be used to determine the noise and interference covariance matrix.

The first detection stage 308 detects at least one layer 315 of the first two-layered signal 314 based on the first filtered signal 318.

The whitening filter 306 may further be used to filter the four-layered signal 312 based on a noise and interference covariance matrix derived from the first two-layered signal

314 to provide a second filtered signal 320. The radio receiver 300 may further comprises a second detection stage 307 for detecting at least one layer 317 of the second two-layered signal 316 based on the second filtered signal 320.

The radio receiver 300 may further include a pair selector 304, e.g. an antenna port pair selector, for selecting a first layer and a second layer of the four-layered signal 312 for division into the first two-layered signal 314 and for selecting a third layer and a fourth layer of the four-layered signal 312 for division into the second two-layered signal 316.

The whitening filter W 306 may derive the noise and interference covariance matrix $R_{NI}$ as described in the following.

3GPP 36.101 standard applies following 4-Layer/2-TX beamforming precoders for the RAN4 EPDCCH tests:

$$P_1 = \frac{1}{\sqrt{2}}\begin{bmatrix}1\\1\end{bmatrix}; \quad \text{Equation 1}$$

$$P_2 = \frac{1}{\sqrt{2}}\begin{bmatrix}1\\-1\end{bmatrix};$$

$$P_3 = \frac{1}{\sqrt{2}}\begin{bmatrix}1\\j\end{bmatrix};$$

$$P_4 = \frac{1}{\sqrt{2}}\begin{bmatrix}1\\-j\end{bmatrix}$$

The layer-to-precoder assignment in Equ.1 is just an example and can be random. If the two jointly detected layers apply collinear precoders as described with respect to FIG. 3, the mutual interference is most significant and the noise-and-interference whitening becomes most beneficial.

2-TX antennas at the eNB as well as 2-RX antennas at the UE are the working assumption, resulting in a 2×2 channel matrix H.

The radio receiver 300 may perform 2-layer noise and interference whitening with layers 1 and 2 being jointly detected as described in the following.

$$y = H[P_1 P_2]\begin{bmatrix}s_1\\s_2\end{bmatrix} + H[P_3 P_4]\begin{bmatrix}s_3\\s_4\end{bmatrix} + n; \quad \text{Equation 7}$$

$$R_N = \sigma^2 I$$

The noise-and-interference covariance matrix can either be determined by $$R_{NI} = H[P_3 P_4][P_3 P_4]^H H^H + R_N \quad \text{Equation 8a}$$

or from the receive signal covariance $$R_{NI} = E\{yy^H\} - H[P_1 P_2][P_1 P_2]^H H^H = R_{yy} - HP_1 P_1^H H^H - HP_2 P_2^H H^H \quad \text{Equation 8b}$$

The Noise-and-Interference Whitening Filter is obtained by Cholesky Decomposition $$R_{NI} = W^{-1} W^{-H} \xrightarrow{yields} W R_{NI} W^H = \sigma^2 I \quad \text{Equ. 8c}$$

and applied to the signal model Equation 2

$$\tilde{y} = Wy \quad \text{Equation 9}$$

$$= WH[P_1 P_2]\begin{bmatrix}s_1\\s_2\end{bmatrix} + WH[P_3 P_4]\begin{bmatrix}s_3\\s_4\end{bmatrix} + WH$$

$$= [P_1 P_2]\begin{bmatrix}s_1\\s_2\end{bmatrix} + \tilde{n};$$

$$E\{\tilde{n}\tilde{n}^H\} = R_N = \sigma^2 I$$

With the MMSE detection filter $$G_{MMSE} = [P_1 P_2]^H H^H W^H (WH[P_1 P_2][P_1 P_1]^H H^H W^H + R_N)^{-1} \quad \text{Equation 10}$$

the transmit signal is obtained to $$\tilde{s}_1 = G_{MMSE} \tilde{y} \quad \text{Equation 11}$$

2 Times 2-Layer detection implies a new function, which is important if the pairing order is not arbitrary, but determined a priori for the actual subframe. E.g. if 4 layers are given, the first two layers to be selected for the first joint 2-Layer detector instance 308 may be pair 1-2, 1-3, 1-4-2-3, 2-4 or 3-4. This 'Pair Selection' functionality is part of the receiver 300 and not limited to 2-layer pair, but would generally extend to a J-layer tuple in case of a joint J-layer detector. In the 2×2-Layer receiver 300 the choice for second 2-Layer instance is trivial: just 2 layers remain for the second detector instance.

For each detection pair, the noise-whitening filter may be calculated (by device 306) based on the estimated noise-covariance matrix averaged over the complementary layer pair.

Figure 4:
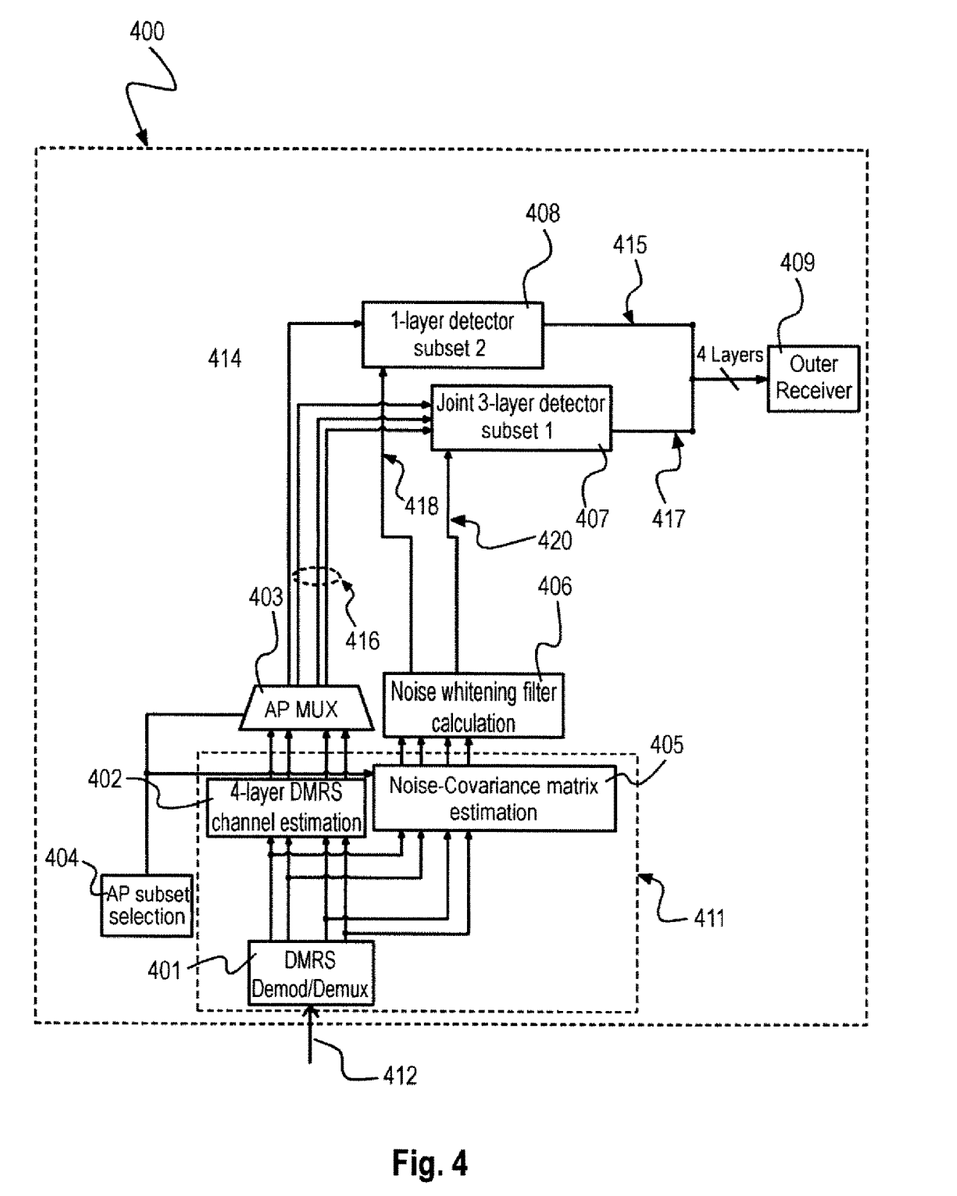
FIG. 4 is a block diagram illustrating an exemplary 1 layer+3 layer whitening radio receiver 400.

FIG. 4 is a block diagram illustrating an exemplary 1 layer+3 layer whitening radio receiver 400. The radio receiver 400 may be an exemplary embodiment of the radio receiver 200 described above with respect to FIG. 2. The radio receiver 400 includes a receiving stage 411, a division stage 401, a whitening filter 406 and a first detection stage 408.

The receiving stage 411 receives a four-layered signal 412 that may include a first layer, a second layer, a third layer and a fourth layer. The receiving stage 411 may include a DMRS demodulator/demultiplexer 401 for demodulating the four-layered signal 412, e.g. a four-layered DMRS signal (demodulation specific reference signal). The receiving stage 411 may further include a 4-layer DMRS channel estimation device 402 for estimating the channel of each layer signal of the four-layered signal 412. The receiving stage 411 may further include a subset-specific noise-covariance matrix estimation device 405 for estimating or determining a noise covariance matrix, e.g. as described below.

The division stage 401, e.g. implemented by the DMRS demodulator/demultiplexer 401 divides or separates the four-layered signal 412 into a one-layered signal 414 and a three-layered signal 416.

The whitening filter 406 filters the four-layered signal 412 based on a noise and interference covariance matrix derived from the three-layered signal 416 to provide a first filtered signal 418. The subset-specific noise-covariance estimation device 405 may be used to determine the noise and interference covariance matrix.

The first detection stage 408 detects a layer 415 of the one-layered signal 414 based on the four-layered signal 412 filtered by the whitening filter 406.

A second detection stage 407 may detect a layer 417 of the three-layered signal 416 based on the four-layered signal 412 filtered by the whitening filter 406.

The radio receiver 400 may further include a selector 404 for selecting a first layer of the four-layered signal 412 for division into the one-layered signal 414 and for selecting a second layer, a third layer and a fourth layer of the four-layered signal 412 for division into the three-layered signal 416.

The whitening filter W 406 may derive the noise and interference covariance matrix $R_{NI}$ as described in the following.

The signal model with noise normalization:

$$y = HP_1 s_1 + H[P_2 P_3 P_4] \begin{bmatrix} s_2 \\ s_3 \\ s_4 \end{bmatrix} + n; \quad \text{Equation 2}$$

$$R_N = \sigma^2 I$$

The noise- and interference covariance matrix:

$$R_{NI} = H[P_2 P_3 P_4][P_2 P_3 P_4]^H H^H + R_N \quad \text{Equation 3a}$$

Alternatively constructed from receive signal:

$$R_{NI} = E\{yy^H\} - HP_1 P_1^H H^H = R_{yy} - HP_1 P_1^H H^H \quad \text{Equation 3b}$$

The Noise-and-Interference Whitening Filter is obtained by Cholesky Decomposition $$R_{NI} = W^{-1} W^{-H} \xrightarrow{yields} W R_{NI} W^H = \sigma^2 I \quad \text{Equation 3c}$$

and applied to the signal model Equ.2

$$\tilde{y} = Wy \quad \text{Equation 4}$$

$$= WHP_1 s_1 + WH[P_2 P_3 P_4] \begin{bmatrix} s_2 \\ s_3 \\ s_4 \end{bmatrix} + Wn$$

$$= WHP_1 s_1 + \tilde{n};$$

$$E\{\tilde{n}\tilde{n}^H\} = R_N = \sigma^2 I$$

With the MMSE detection filter $$G_{MMSE} = P_1^H H^H W^H (W H P_1 P_1^H H^H W^H + R_N)^{-1} \quad \text{Equation 5}$$

the transmit signal is obtained to $$\tilde{s}_1 = G_{MMSE} \tilde{y} \quad \text{Equation 6}$$

Note that Equations 5, 6, 10 and 11 are specific for MMSE detection, but can be replaced by any detector type without loss of generality.

The radio receiver 300 may apply the noise-and-interference whitening filter W' band the selection of the 2-layer EPDCCH subset, e.g. according to Equations 8a/b/c.

The advantage of Equation 3b and 6b is the implicit mitigation of any unknown interference in the receive signal.

Figure 5:
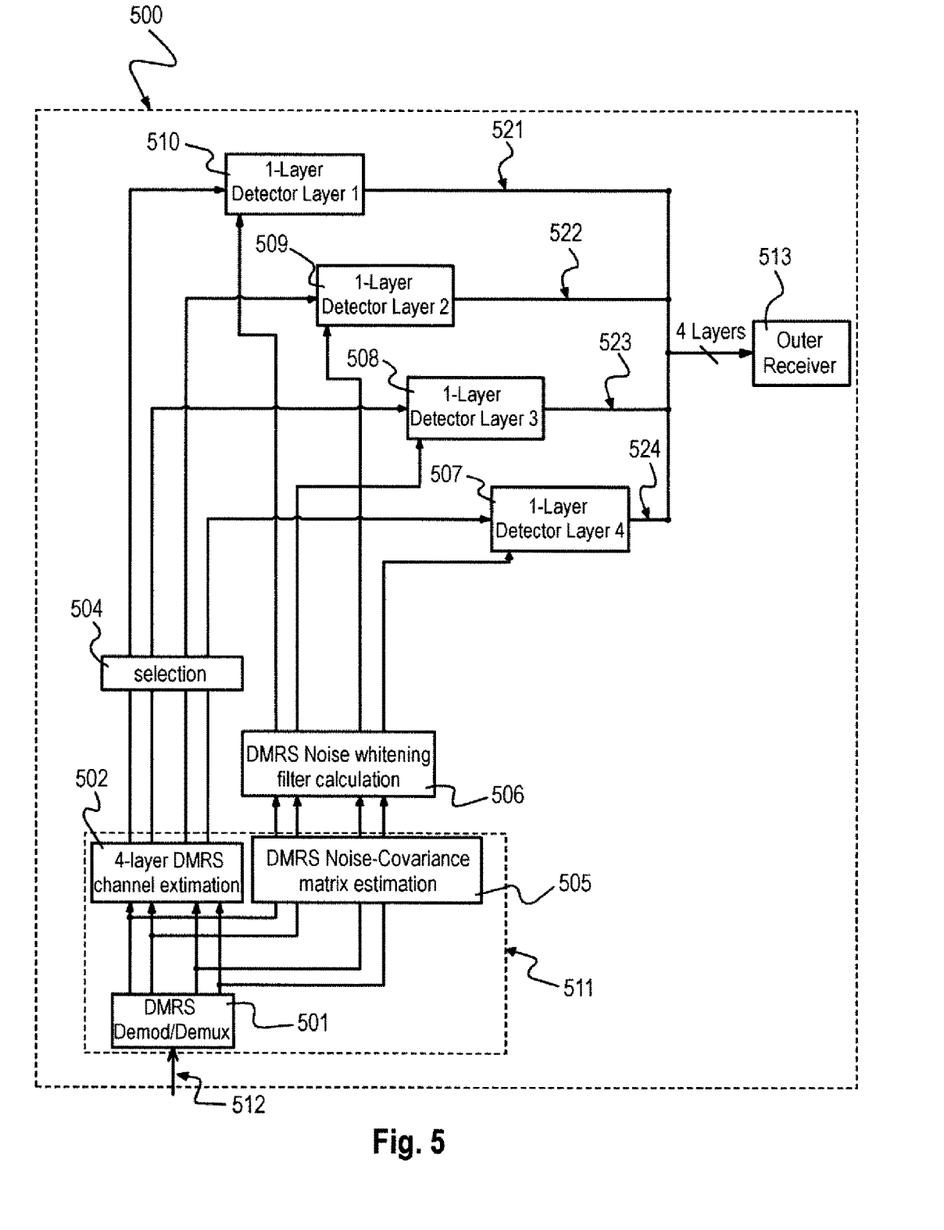
FIG. 5 is a block diagram illustrating an exemplary 4×1 layer whitening radio receiver 500.

FIG. 5 is a block diagram illustrating an exemplary 4×1 layer whitening radio receiver 500. The radio receiver 500 may be an exemplary embodiment of the radio receiver 200 described above with respect to FIG. 2. The radio receiver 500 includes a receiving stage 511, a selection stage 504, a whitening filter 506, a first detection stage 507, a second detection stage 508, a third detection stage 509, a fourth detection stage 510 and an outer receiver 513.

The receiving stage 511 receives a four-layered signal 512 that may include a first layer, a second layer, a third layer and a fourth layer. The receiving stage 511 may include a DMRS demodulator/demultiplexer 501 for demodulating the four-layered signal 512, e.g. a four-layered DMRS signal (demodulation specific reference signal). The receiving stage 411 may further include a 4-layer DMRS channel estimation device 502 for estimating the channel of each layer signal of the four-layered signal 512. The receiving stage 511 may further include a DMRS noise-covariance matrix estimation device 505 for estimating or determining a noise covariance matrix.

The DMRS demodulator/demultiplexer 501 or division stage 501 may be used for dividing the four-layered signal 512 into the four one-layered signals 521, 522, 523, 524.

The whitening filter 506 filters the four-layered signal 512 based on a noise and interference covariance matrix. The subset-specific noise-covariance estimation device 505 may be used to determine the noise and interference covariance matrix.

The first detection stage 510 detects the first layer 521 based on the four-layered signal 512 filtered by the whitening filter 506. The second detection stage 509 detects the second layer 522 based on the four-layered signal 512 filtered by the whitening filter 506. The third detection stage 508 detects the third layer 523 based on the four-layered signal 512 filtered by the whitening filter 506. The fourth detection stage 507 detects the fourth layer 524 based on the four-layered signal 512 filtered by the whitening filter 506.

The selector 504 may select the different layers provided to the detection devices 510, 511, 512, 513.

The functionality of the receiver 500 is according to the following description. In the receiver 500, four instances of the 1-Layer may be called to detect the 4 transmit layers. For each instance the average noise-covariance matrix of the interfering layers is estimated and used for its specific noise-whitening calculation.

Subset-Interference and Noise Whitening eliminates the BLER degradation for reduced-layer detection. In particular, if the beam-forming pre-coders are not orthogonal, then interference without using whitening filters as described in this disclosure may be severe. The actual number of transmitted layers may be not reported to the receiver, e.g. can be less than 4. The receiver 500 can detect all 4 potential layers, which can be extended to any other maximum layer number without loss of generality. As joint-layer options the HW implementation of either a 1-layer, a 2-layer or a 4-layer detector may be applied.

The radio receivers 200, 300, 400, 500 described above with respect to FIGS. 2 to 5 solve the fundamental problem of limited layer-detection capability in the receiver hardware architecture. The receiver 200, 300, 400, 500 is capable of single or some joint multi-layer detection. The received signal however, may be assumed to be the superposition of more layers than the detector HW is supporting for joint detection, also known as underdetermined detection. All layers of the target signal can be detected by the receiver 200, 300, 400, 500.

Figure 6:
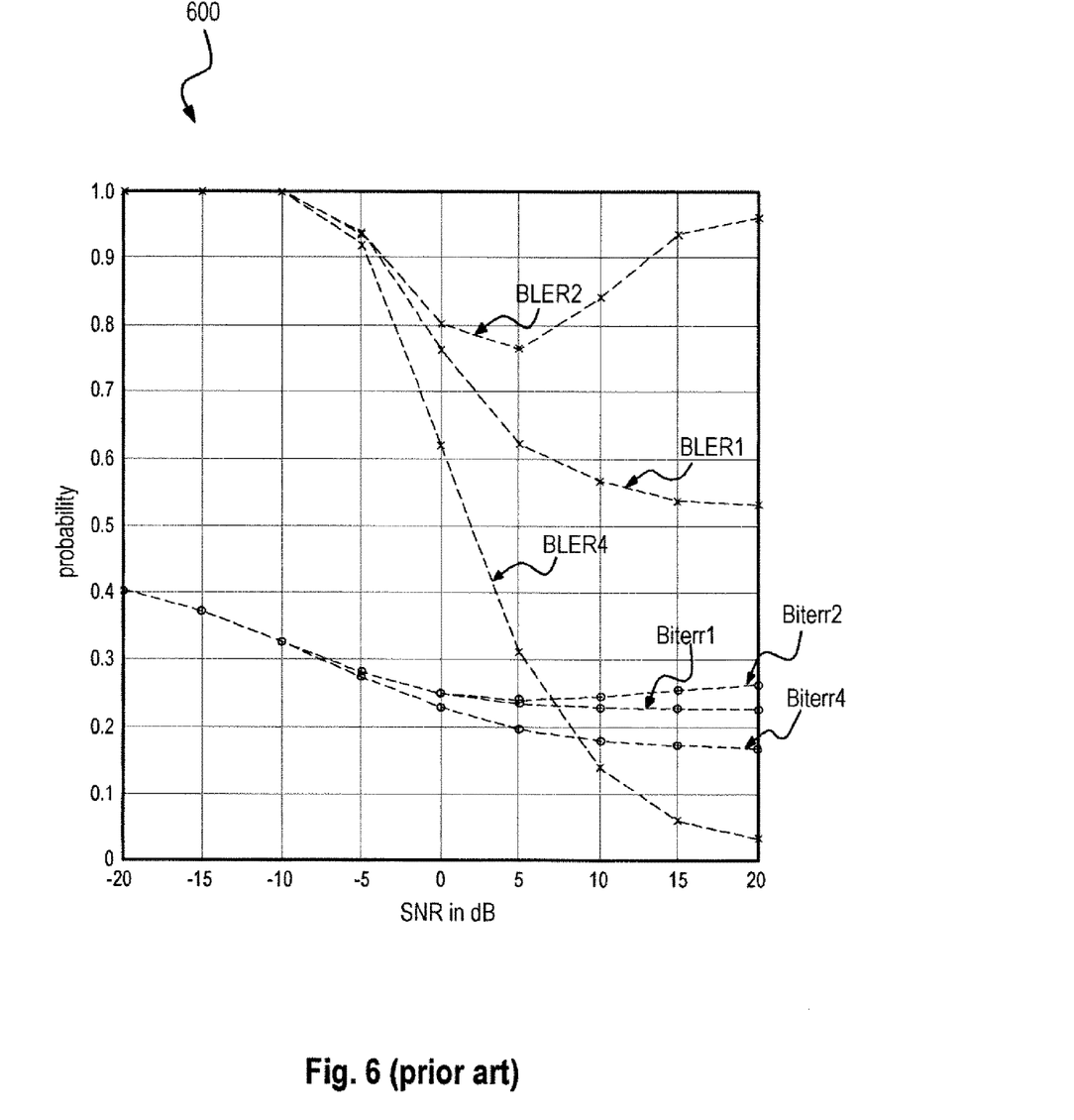
FIG. 6 is a performance diagram illustrating conventional linear MMSE detection without interference whitening.
Figure 7:
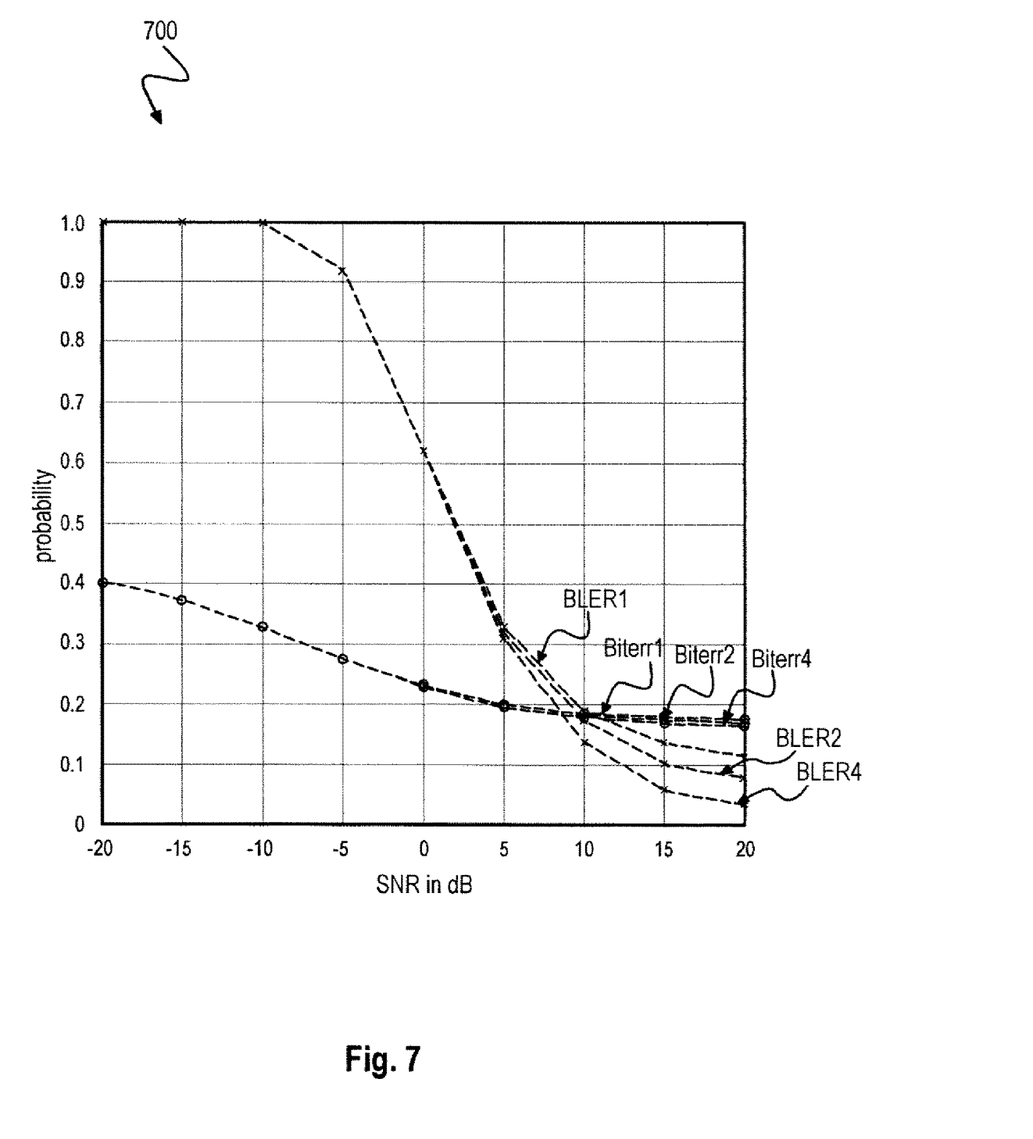
FIG. 7 is a performance diagram illustrating linear MMSE detection with interference whitening.

The receiver 200, 300, 400, 500 may selectively separate the layers into subsets for the individual detector instances 207 (in FIG. 2 only one detector instance 207 is shown, further detector instances are shown in FIGS. 3 to 5, for example), e.g. by using the division stage 203. An algorithm, also referred to as first algorithm, may be used to selectively separate the layers into subsets for the individual detector instances 207. Another algorithm, also referred to as second algorithm may be used for providing compensation for the performance degradation of the underdetermined detection. Performance diagrams described below with respect to FIGS. 6 and 7 illustrate that by using that second algorithm optimum performance can be reached. The radio receiver 200, 300, 400, 500 can be applied for EPDCCH detection in LTE Release 10 and beyond, but is also applicable to any multi-layered signal.

The receiver 200, 300, 400, 500 may implement scalable reuse of a joint reduced-layer detector HW without performance degradation compared to the optimum solution of a single "all-layer" detector HW resource. Assuming a receive signal, which is composed of M layers as described above with respect to FIG. 1 where each of the M layers is interfered by the M−1 other layers. Joint detection of all M layers would be the optimum solution, which corresponds to a joint M-layer detector as single HW block. Complexity-wise this is not an ideal solution. Typically such "all-layer" detector is only applied for specific subframe configurations and would be a complexity overhead for majority of subframes, in which less transmitted layers exist in the receive signal. To balance the overall receiver complexity it may be preferred to design a detector HW, which supports joint detection of L<M layers and that may be instantiated multiple times to detect all layers, e.g. ceil(M/L) in C-notation. However, joint detection of L-layered subsets is sub-optimum compared to joint detection of all layers. To overcome the performance degradation for each L-layered subset a Pair-specific noise-whitening filter may be applied in the receiver 200, 300, 400, 500, which compensates for the interference of the complementary M-L layers. A selection device, e.g. as described below with respect to FIGS. 3 to 5 may perform the subset selection. The selection device may for example select L out of M layers for the first L-layer demodulation, L out of M-L layer for the second L-layer demodulation and so on.

FIG. 6 is a performance diagram illustrating conventional linear MMSE detection without interference whitening and FIG. 7 is a performance diagram illustrating linear MMSE detection with interference whitening A primary use case addressed by the receivers according to the disclosure is the detection of the Enhanced Physical Control Channel (EPDCCH) as introduced in LTE Release 11: The EPDCCH transmission applies per-layer beamforming, uses DMRS for channel estimation, supports up to 2 individual EPDCCH sets with 4 layers each and is similar to the LTE transmission mode 9.

The blind decoding of the control message candidates in the outer control receiver requires the full detection of all 4 layers per RE of both EPDCCH sets.

The simulation results depicted in FIGS. 6 and 7 compare 1-layer, 2-layer and 4-layer detection of 4-layer receive signal without and with interference whitening for a baseline MMSE detector.

For the simulations of FIGS. 6 and 7, the link-level simulator, which may be embedded into the receiver design flow, is used according to the following exemplary setup: Channel-Model=EVA05-lowcorrEVM0; Channel Estimation=perfect; Noise Estimation=perfect; SNR=−20:5:20; Number of Subframes=80; "Port Selection" 2-Layer Demodulator: SelGroup=2=>[107,109] and [108,110] as non-orthogonal precoder pairs; Aggregation Level: nECCE_per_EPDCCH=4; Whitening Types: a) Whitening=0=>noise scaling (w/o Interference); b) Whitening=1=>ideal Whitening Filter (Noise+Interference Covariance Matrix) according to receivers described in this disclosure.

FIG. 6 demonstrates the linear MMSE detection performance, expressed by BLER and raw bit-error ratio, with the state-of-the-art noise (AWGN) scaling, also known as scalar noise whitening.

BLER1 is the block error rate and Biterr1 is the bit error rate for the 1-layer MMSE detector. BLER2 is the block error rate and Biterr2 is the bit error rate for the 2-layer MMSE detector.

BLER4 is the block error rate and Biterr4 is the bit error rate for the 4-layer MMSE detector.

The most significant outcome is the unexpected and unacceptable BLER result (BLER2) for the linear 2-Layer MMSE detector, which is even outperformed by the 1-Layer demodulator (BLER1). At 5 dB the model mismatch for the joint layer detection becomes significant. Prior to 5 dB the noise, beyond 5 dB the 2 interfering layers are the dominant noise source, which are not accounted for by the 2-Layer MMSE model.

The 4-layer detector (BLER4) is the optimum solution with best detection performance and sets the lower bound on raw and block error ratio.

FIG. 7 demonstrates the performance of linear MMSE detection with interference whitening, i.e. the performance of receivers according to the disclosure.

BLER1 is the block error rate and Biterr1 is the bit error rate for the 1-layer MMSE detector. BLER2 is the block error rate and Biterr2 is the bit error rate for the 2-layer MMSE detector. BLER4 is the block error rate and Biterr4 is the bit error rate for the 4-layer MMSE detector.

In FIG. 7, an Interference-and-Noise Whitening Filter is applied, which significantly boosts the 1- and 2-layer detection performance close to the optimum. At 15 dB the 2-layer detector (BLER2) is 2.5 dB worse than the 4-layer detector (BLER4), but more than 5 dB better than the 1-layer detector (BLER1).

For the EPDCCH use case referring to the 2-layer detector, the BLER drops below 10% at 15 dB with the whitening filter. Without whitening filter the 10% BLER cannot be reached at all with the 1- or 2-layer detector (see FIG. 6). 10% BLER is an accepted BLER limit in typical performance tests, e.g. 3GPP RAN4 (36.101).

Figure 8:
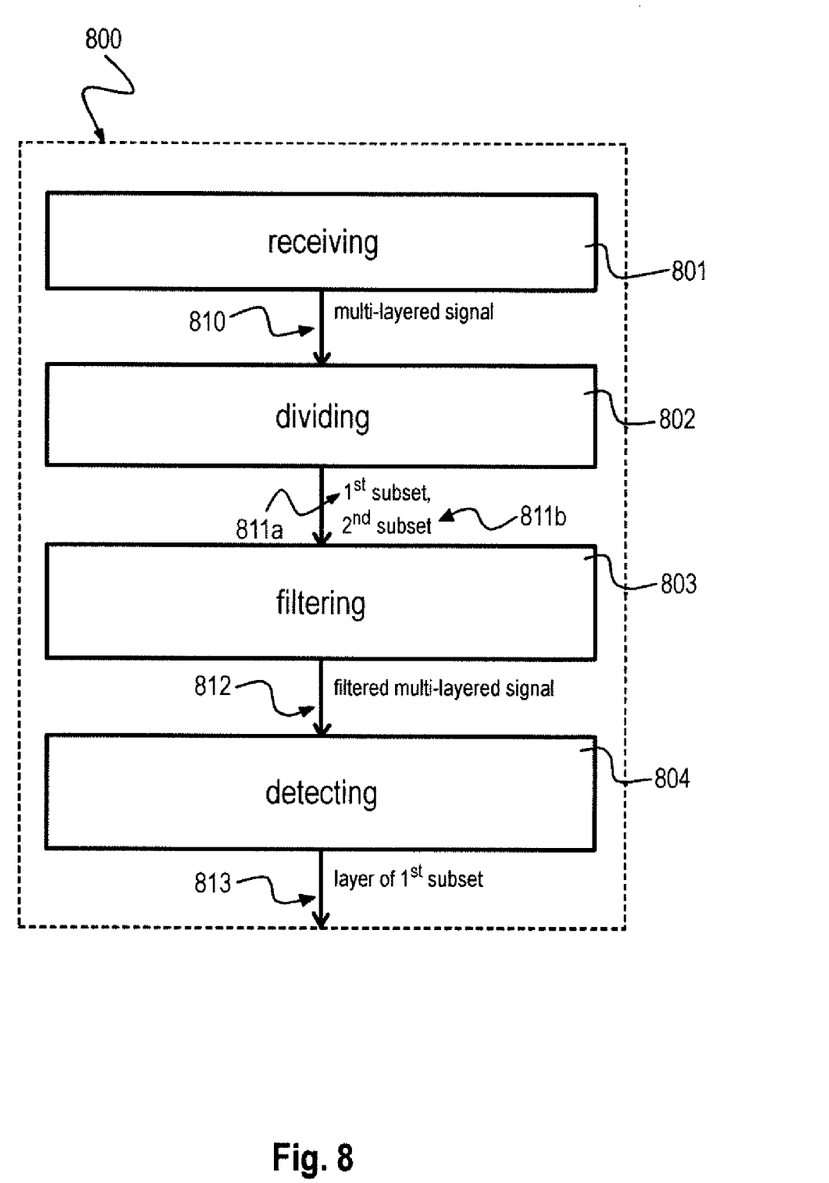
FIG. 8 schematically illustrates an exemplary method 800 for detecting a layer of a multi-layered signal.

FIG. 8 schematically illustrates an exemplary method 800 for detecting a layer of a multi-layered signal.

The method 800 includes receiving 801 a multi-layered signal 810 comprising a plurality of layers, e.g. according to the receiving stage 201 described above with respect to FIG. 2. The method 800 includes dividing 802 the plurality of layers into a first subset 811a and a second subset 811b, e.g. according to the division stage 203 described above with respect to FIG. 2. The method 800 includes filtering 803 the multi-layered signal 810 based on a first noise and interference covariance matrix derived from the layers of the second subset 811b, e.g. according to the whitening filter 205 described above with respect to FIG. 2. The method 800 includes detecting 804 at least one layer of the first subset 811a based on the multi-layered signal 810 filtered by first noise and interference covariance matrix, e.g. according to the detection stage 207 described above with respect to FIG. 2.

The method 800 may further include filtering 803 the multi-layered signal 810 based on a second noise and interference covariance matrix derived from the layers of the first subset 811a. Them method 800 may further include detecting 804 at least one layer of the second subset 811b based on the multi-layered signal 810 filtered by the second noise and interference covariance matrix.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 800 as described above with respect to FIG. 8. Such a computer program product may include a readable storage medium storing program code thereon for use by a processor, the program code comprising instructions for performing any of the method 800 as described above.

Examples

The following examples pertain to further embodiments. Example 1 is a radio receiver, comprising: a receiving stage configured to receive a multi-layered signal comprising a plurality of layers; a division stage configured to divide the plurality of layers into a first subset and a second subset; a first whitening filter configured to filter the multi-layered signal based on a noise and interference covariance measure derived from the second subset to provide a first filtered multi-layered signal; a first detection stage configured to detect at least one layer of the first subset based on the first filtered multi-layered signal.

In Example 2, the subject matter of Example 1 can optionally include that the first detection stage is configured to jointly detect the layers of the first subset based on the first filtered multi-layered signal.

In Example 3, the subject matter of Example 1 can optionally include that the radio receiver is configured to iteratively apply the division stage and the first whitening filter to the multi-layered signal until a single layer of the multi-layered signal resides in the first subset.

In Example 4, the subject matter of any one of Examples 1-3 can optionally include that the division stage is configured to divide the plurality of layers of the multi-layered signal for assigning each layer of the multi-layered signal either to the first subset or the second subset.

In Example 5, the subject matter of any one of Examples 1-4 can optionally include that the first whitening filter is configured to provide the first filtered multi-layered signal in which a noise-and-interference from the layers of the second subset is compensated.

In Example 6, the subject matter of any one of Examples 1-5 can optionally include that the first detection stage is configured to filter the first filtered multi-layered signal with a Minimum Mean Square Error (MMSE) detection filter to detect the at least one layer of the first subset.

In Example 7, the subject matter of any one of Examples 1-6 can optionally include a second whitening filter configured to filter the multi-layered signal based on a noise and interference covariance measure derived from the first subset to provide a second filtered multi-layered signal; and a second detection stage configured to detect at least one layer of the second subset based on the second filtered multi-layered signal.

In Example 8, the subject matter of Example 7 can optionally include a selection stage configured to select a first plurality of layers of the multi-layered signal for division into the first subset and a second plurality of layers of the multi-layered signal for division into the second subset.

In Example 9, the subject matter of any one of Examples 7-8 can optionally include an outer receiver, configured to receive the at least one layer of the first subset detected by the first detection stage and the at least one layer of the second subset detected by the second detection stage.

In Example 10, the subject matter of Example 9 can optionally include that the selection stage is configured to select the first plurality of layers and the second plurality of layers for providing an uninterrupted load to the outer receiver.

In Example 11, the subject matter of any one of Examples 8-10 can optionally include that the selection stage is configured to select the first plurality of layers and the second plurality of layers based on a metric depending on the plurality of layers of the multi-layered signal.

In Example 12, the subject matter of Example 11 can optionally include that the metric depends on power levels of the plurality of layers of the multi-layered signal.

In Example 13, the subject matter of Example 12 can optionally include a channel estimator configured to determine the power levels of the plurality of layers of the multi-layered signal.

In Example 14, the subject matter of any one of Examples 11-13 can optionally include that the metric depends on priorities of the plurality of layers of the multi-layered signal.

Example 15 is a radio receiver, comprising: a receiving stage configured to receive a four-layered signal; a division stage configured to divide the four-layered signal into a first two-layered signal and a second two-layered signal; a whitening filter configured to filter the four-layered signal based on a noise and interference covariance matrix derived from the second two-layered signal to provide a first filtered signal; a first detection stage configured to detect at least one layer of the first two-layered signal based on the first filtered signal.

In Example 16, the subject matter of Example 15 can optionally include that the whitening filter is further configured to filter the four-layered signal based on a noise and interference covariance matrix derived from the first two-layered signal to provide a second filtered signal; and that the radio receiver further comprises a second detection stage configured to detect at least one layer of the second two-layered signal based on the second filtered signal.

In Example 17, the subject matter of Example 16 can optionally include a pair selector configured to select a first layer and a second layer of the four-layered signal for division into the first two-layered signal and configured to select a third layer and a fourth layer of the four-layered signal for division into the second two-layered signal.

In Example 18, the subject matter of Example 17 can optionally include that the whitening filter W is configured to derive the noise and interference covariance matrix $R_{NI}$ according to the following relations:

$$y = H[P_1 P_2]\begin{bmatrix} s_1 \\ s_2 \end{bmatrix} + H[P_3 P_4]\begin{bmatrix} s_3 \\ s_4 \end{bmatrix} + n;$$

$$R_N = \sigma^2 I$$

$$R_{NI} = H[P_3 P_4][P_3 P_4]^H H^H + R_N$$

or $$R_{NI} = E\{yy^H\} - H[P_1 P_2][P_1 P_2]^H H^H$$
$$= R_{yy} - H P_1 P_1^H H^H - H P_2 P_2^H H^H$$

with $$R_{NI} = W^{-1} W^{-H},$$

where y is the four-layered signal, $s_1$ is the first layer, $s_2$ is the second layer, $s_3$ is the third layer and $s_4$ is the fourth layer of the four-layered signal, $P_1$ is a precoding matrix of the first layer, $P_2$ is a precoding matrix of the second layer, $P_3$ is a precoding matrix of the third layer and $P_4$ is a precoding matrix of the fourth layer, H is a channel matrix and $R_N$ is a noise matrix.

In Example 19, the subject matter of any one of Examples 15-18 can optionally include that the first detection stage is configured to filter the four-layered signal y filtered by the whitening filter W with a Minimum Mean Square Error (MMSE) detection filter $G_{MMSE}$ according to the following relation:

$$G_{MMSE} = [P_1 P_2]^H H^H W^H (WH[P_1 P_2][P_1 P_2]^H H^H W^H + R_N)^{-1}$$

Example 20 is a radio receiver, comprising: a receiving stage configured to receive a four-layered signal; a division stage configured to divide the four-layered signal into a one-layered signal and a three-layered signal; a whitening filter configured to filter the four-layered signal based on a noise and interference covariance matrix derived from the three-layered signal; a detection stage configured to detect a layer of the one-layered signal based on the four-layered signal filtered by the whitening filter.

In Example 21, the subject matter of Example 20 can optionally include a selector configured to select a first layer of the four-layered signal for division into the one-layered signal and configured to select a second layer, a third layer and a fourth layer of the four-layered signal for division into the three-layered signal.

In Example 22, the subject matter of Example 21 can optionally include that the whitening filter W is configured to derive the noise and interference covariance matrix $R_{NI}$ according to the following relations:

$$y = H P_1 s_1 + H[P_2 P_3 P_4]\begin{bmatrix} s_2 \\ s_3 \\ s_4 \end{bmatrix} + n;$$

$$R_N = \sigma^2 I$$

$$R_{NI} = H[P_2 P_3 P_4][P_2 P_3 P_4]^H H^H + R_N$$

or $$R_{NI} = E\{yy^H\} - H P_1 P_1^H H^H = R_{yy} - H P_1 P_1^H H^H$$

with $$R_{NI} = W^{-1} W^{-H},$$

where y is the four-layered signal, $s_1$ is the first layer, $s_2$ is the second layer, $s_3$ is the third layer and $s_4$ is the fourth layer of the four-layered signal, $P_1$ is a precoding matrix of the first layer, $P_2$ is a precoding matrix of the second layer, $P_3$ is a precoding matrix of the third layer and $P_4$ is a precoding matrix of the fourth layer, H is a channel matrix and $R_N$ is a noise matrix In Example 23, the subject matter of Example 22 can optionally include that the detection stage is configured to filter the four-layered signal y filtered by the whitening filter W with a Minimum Mean Square Error (MMSE) detection filter $G_{MMSE}$ according to the following relation:

$$G_{MMSE} = P_1^H H^H W^H (WH P_1 P_1^H H^H W^H + R_N)^{-1}.$$

Example 24 is a method for detecting a layer of a multi-layered signal, the method comprising: receiving a multi-layered signal comprising a plurality of layers; dividing the plurality of layers into a first subset and a second subset; filtering the multi-layered signal based on a first noise and interference covariance matrix derived from the layers of the second subset; and detecting at least one layer of the first subset based on the multi-layered signal filtered by first noise and interference covariance matrix.

In Example 25, the subject matter of Example 24 can optionally include filtering the multi-layered signal based on a second noise and interference covariance matrix derived from the layers of the first subset; and detecting at least one layer of the second subset based on the multi-layered signal filtered by the second noise and interference covariance matrix.

Example 26 is a computer readable medium on which computer instructions are stored which when executed by a computer, cause the computer to perform the method of one of Examples 24 to 25.

Example 27 is a device for detecting a layer of a multi-layered signal, the device comprising: means for receiving a multi-layered signal comprising a plurality of layers; means for dividing the plurality of layers into a first subset and a second subset; means for filtering the multi-layered signal based on a first noise and interference covariance matrix derived from the layers of the second subset; and means for detecting at least one layer of the first subset based on the multi-layered signal filtered by first noise and interference covariance matrix.

In Example 28, the subject matter of Example 27 can optionally include means for filtering the multi-layered signal based on a second noise and interference covariance matrix derived from the layers of the first subset; and means for detecting at least one layer of the second subset based on the multi-layered signal filtered by the second noise and interference covariance matrix.

Example 29 is a system, comprising: a receiving subsystem configured to receive a multi-layered signal comprising a plurality of layers; a division subsystem configured to divide the plurality of layers into a first subset and a second subset; a first whitening filter subsystem configured to filter the multi-layered signal based on a noise and interference covariance measure derived from the second subset to provide a first filtered multi-layered signal; a first detection subsystem configured to detect at least one layer of the first subset based on the first filtered multi-layered signal.

In Example 30, the subject matter of Example 29 can optionally include that the first detection subsystem is configured to jointly detect the layers of the first subset based on the first filtered multi-layered signal.

In Example 31, the subject matter of Example 29 can optionally include that the system is configured to iteratively apply the division subsystem and the first whitening filter subsystem to the multi-layered signal until a single layer of the multi-layered signal resides in the first subset.

In Example 32, the subject matter of any one of Examples 29-31 can optionally include that the division subsystem is configured to divide the plurality of layers of the multi-layered signal for assigning each layer of the multi-layered signal either to the first subset or the second subset.

In Example 33, the subject matter of any one of Examples 29-32 can optionally include that the first whitening filter subsystem is configured to provide the first filtered multi-layered signal in which a noise-and-interference from the layers of the second subset is compensated.

In Example 34, the subject matter of any one of Examples 29-33 can optionally include that the first detection subsystem is configured to filter the first filtered multi-layered signal with a Minimum Mean Square Error (MMSE) detection filter to detect the at least one layer of the first subset.

In Example 35, the subject matter of any one of Examples 29-34 can optionally include a second whitening filter subsystem configured to filter the multi-layered signal based on a noise and interference covariance measure derived from the first subset to provide a second filtered multi-layered signal; and a second detection subsystem configured to detect at least one layer of the second subset based on the second filtered multi-layered signal.

In Example 36, the subject matter of Example 35 can optionally include a selection subsystem configured to select a first plurality of layers of the multi-layered signal for division into the first subset and a second plurality of layers of the multi-layered signal for division into the second subset.

In Example 37 the subject matter of anyone of Examples 35-36 can optionally include an outer receiver subsystem, configured to receive the at least one layer of the first subset detected by the first detection subsystem and the at least one layer of the second subset detected by the second detection subsystem.

In Example 38, the subject matter of Example 37 can optionally include that the selection subsystem is configured to select the first plurality of layers and the second plurality of layers for providing an uninterrupted load to the outer receiver subsystem.

In Example 39, the subject matter of any one of Examples 36-38 can optionally include that the selection subsystem is configured to select the first plurality of layers and the second plurality of layers based on a metric depending on the plurality of layers of the multi-layered signal.

In Example 40, the subject matter of Example 39 can optionally include that the metric depends on power levels of the plurality of layers of the multi-layered signal.

In Example 41, the subject matter of Example 40 can optionally include a channel estimator subsystem configured to determine the power levels of the plurality of layers of the multi-layered signal.

In Example 42, the subject matter of any one of Examples 39-41 can optionally include that the metric depends on priorities of the plurality of layers of the multi-layered signal.

In Example 43, the subject matter of any one of Examples 29-42 can optionally include that the system is implemented as an on-chip system.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A radio receiver, comprising:
   a demultiplexer configured to receive a multi-layered signal comprising a plurality of layers, and
   to divide the plurality of layers into a first subset and a second subset;
   a first whitening filter configured to filter the multi-layered signal based on a noise and interference covariance measure calculated for each of the first subset and the second subset such that the noise and interference covariance measure is derived from the second subset to provide a first filtered multi-layered signal, and the noise and interference covariance measure is derived from the first subset to provide a second filtered multi-layered signal; and
   a first detection filter configured to detect at least one layer of the first subset based on the first filtered multi-layered signal.

2. The radio receiver of claim 1
   wherein the first detection filter is configured to jointly detect the layers of the first subset based on the first filtered multi-layered signal.

3. The radio receiver of claim 1,
   wherein the radio receiver is configured to iteratively apply the demultiplexer and the first whitening filter to the multi-layered signal until a single layer of the multi-layered signal resides in the first subset.

4. The radio receiver of claim 1,
   wherein the demultiplexer is configured to divide the plurality of layers of the multi-layered signal for assigning each layer of the multi-layered signal either to the first subset or the second subset.

5. The radio receiver of claim 1,
   wherein the first whitening filter is configured to provide the first filtered multi-layered signal in which a noise-and-interference from the layers of the second subset is compensated.

6. The radio receiver of claim 1,
   wherein the first detection filter is configured to filter the first filtered multi-layered signal with a Minimum Mean Square Error (MMSE) detection filter to detect the at least one layer of the first subset.

7. The radio receiver of claim 1, comprising:
a second whitening filter configured to filter the multi-layered signal based on a noise and interference covariance measure derived from the first subset to provide a second filtered multi-layered signal; and
a second detection filter configured to detect at least one layer of the second subset based on the second filtered multi-layered signal.

8. The radio receiver of claim 7, comprising:
a selector configured to select a first plurality of layers of the multi-layered signal for division into the first subset and a second plurality of layers of the multi-layered signal for division into the second subset.

9. The radio receiver of claim 7, comprising:
an outer receiver, configured to receive the at least one layer of the first subset detected by the first detection filter and the at least one layer of the second subset detected by the second detection filter.

10. The radio receiver of claim 9,
wherein the selector is configured to select the first plurality of layers and the second plurality of layers for providing an uninterrupted load to the outer receiver.

11. The radio receiver of claim 8,
wherein the selector is configured to select the first plurality of layers and the second plurality of layers based on a metric depending on the plurality of layers of the multi-layered signal.

12. The radio receiver of claim 11,
wherein the metric depends on power levels of the plurality of layers of the multi-layered signal.

13. The radio receiver of claim 12, comprising:
a channel estimator configured to determine the power levels of the plurality of layers of the multi-layered signal.

14. The radio receiver of claim 11,
wherein the metric depends on priorities of the plurality of layers of the multi-layered signal.

15. A radio receiver, comprising:
a demultiplexer configured to receive a four-layered signal, and to divide the four-layered signal into a first two-layered signal and a second two-layered signal;
a whitening filter configured to filter the four-layered signal based on a noise and interference covariance matrix derived from the second two-layered signal to provide a first filtered signal;
a first detection filter configured to detect at least one layer of the first two-layered signal based on the first filtered signal.

16. The radio receiver of claim 15,
wherein the whitening filter is further configured to filter the four-layered signal based on a noise and interference covariance matrix derived from the first two-layered signal to provide a second filtered signal;
wherein the radio receiver further comprises a second detection filter configured to detect at least one layer of the second two-layered signal based on the second filtered signal.

17. The radio receiver of claim 16, comprising:
a pair selector configured to select a first layer and a second layer of the four-layered signal for division into the first two-layered signal and configured to select a third layer and a fourth layer of the four-layered signal for division into the second two-layered signal.

18. The radio receiver of claim 17,
wherein the whitening filter having whitening filter properties W is configured to derive the noise and interference covariance matrix $R_{NI}$ according to the following relations:

$$y = H[P_1 P_2]\begin{bmatrix} s_1 \\ s_2 \end{bmatrix} + H[P_3 P_4]\begin{bmatrix} s_3 \\ s_4 \end{bmatrix} + n;$$

$$R_N = \sigma^2 I$$

$$R_{NI} = H[P_3 P_4][P_3 P_4]^H H^H + R_N$$

or $$R_{NI} = E\{yy^H\} - H[P_1 P_2][P_1 P_2]^H H^H$$
$$= R_{yy} - HP_1 P_1^H H^H - HP_2 P_2^H H^H$$

with $$R_{NI} = W^{-1} W^{-H},$$

where y is the four-layered signal, $s_1$ is the first layer, $s_2$ is the second layer, $s_3$ is the third layer, and $s_4$ is the fourth layer of the four-layered signal, $P_1$ is a precoding matrix of the first layer, $P_2$ is a precoding matrix of the second layer, $P_3$ is a precoding matrix of the third layer and $P_4$ is a precoding matrix of the fourth layer, H is a channel matrix and $R_N$ is a noise matrix.

19. The radio receiver of claim 15,
wherein the first detection stage is configured to filter the four-layered signal y filtered by the whitening filter having whitening filter properties W with a Minimum Mean Square Error (MMSE) detection filter $G_{MMSE}$ according to the following relation:

$G_{MMSE} = [P_1 P_2]^H H^H W^H (WH[P_1 P_2][P_1 P_2]^H H^H W^H + R_N)^{-1},$ where $P_1$ is a precoding matrix of the first layer of the four-layered signal, $P_2$ is a precoding matrix of the second layer of the four-layered signal, H is a channel matrix, and $R_N$ is a noise matrix.

20. A radio receiver, comprising:
a demultiplexer configured to receive a four-layered signal, and
to divide the four-layered signal into a one-layered signal and a three-layered signal;
a whitening filter configured to filter the four-layered signal based on a noise and interference covariance matrix derived from the three-layered signal; and
a detection filter configured to detect a layer of the one-layered signal based on the four-layered signal filtered by the whitening filter.

21. The radio receiver of claim 20, comprising:
a selector configured to select a first layer of the four-layered signal for division into the one-layered signal and configured to select a second layer, a third layer, and a fourth layer of the four-layered signal for division into the three-layered signal.

22. The radio receiver of claim 21,
wherein the whitening filter having whitening filter properties W is configured to derive the noise and interference covariance matrix $R_{NI}$ according to the following relations:

$$y = HP_1 s_1 + H[P_2 P_3 P_4]\begin{bmatrix} s_2 \\ s_3 \\ s_4 \end{bmatrix} + n;$$

-continued $$R_N = \sigma^2 I$$

$$R_{NI} = H[P_2 P_3 P_4][P_2 P_3 P_4]^H H^H + R_N$$

or $$R_{NI} = E\{yy^H\} - HP_1 P_1^H H^H = R_{yy} - HP_1 P_1^H H^H$$

with $$R_{NI} = W^{-1} W^{-H},$$

where y is the four-layered signal, $s_1$ is the first layer, $s_2$ is the second layer, $s_3$ is the third layer, and $s_4$ is the fourth layer of the four-layered signal, $P_1$ is a precoding matrix of the first layer, $P_2$ is a precoding matrix of the second layer, $P_3$ is a precoding matrix of the third layer, and $P_4$ is a precoding matrix of the fourth layer, and H is a channel matrix and $R_N$ is a noise matrix.

23. The radio receiver of claim 22,
wherein the detection filter is configured to filter the four-layered signal y filtered by the whitening filter having whitening filter properties W with a Minimum Mean Square Error (MMSE) detection filter $G_{MMSE}$ according to the following relation:

$$G_{MMSE} = P_1^H H^H W^H (W H P_1 P_1^H H^H W^H + R_N)^{-1},$$

where $P_1$ is a precoding matrix of the first layer of the four-layered signal, $P_2$ is a precoding matrix of the second layer of the four-layered signal, H is a channel matrix, and $R_N$ is a noise matrix.

24. A method for detecting a layer of a multi-layered signal, the method comprising:
receiving a multi-layered signal comprising a plurality of layers;
dividing the plurality of layers into a first subset and a second subset;
filtering the multi-layered signal based on a first noise and interference covariance matrix derived from the layers of the second subset; and
detecting at least one layer of the first subset based on the multi-layered signal filtered by first noise and interference covariance matrix;
filtering the multi-layered signal based on a second noise and interference covariance matrix derived from the layers of the first subset; and
detecting at least one layer of the second subset based on the multi-layered signal filtered by the second noise and interference covariance matrix.

* * * * *